July 1, 1924.
W. G. WILSON
RIVET OR CLIP
Filed Feb. 13, 1922
1,500,021
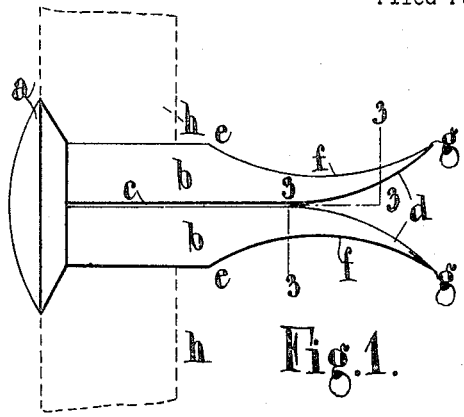 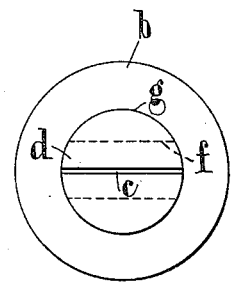 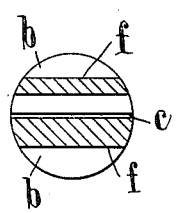
Fig.1.  Fig.2.  Fig.3.
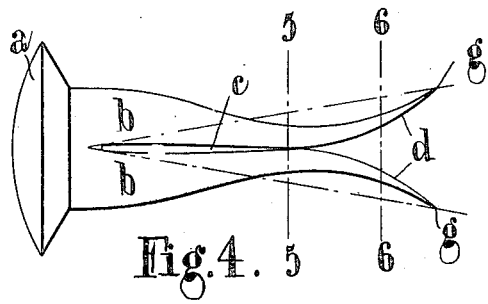 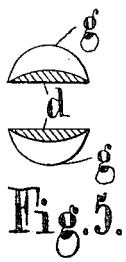 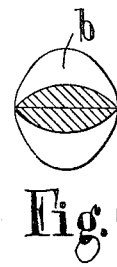
Fig.4.  Fig.5.  Fig.6.
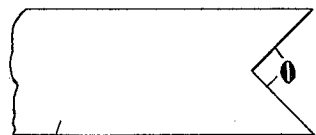
Fig.8.
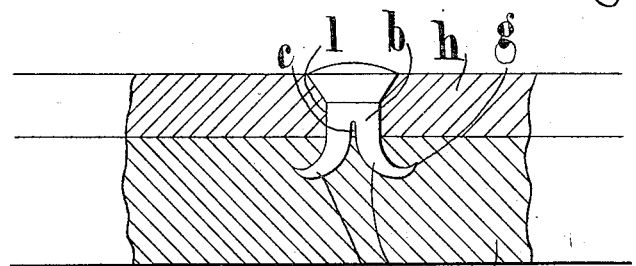
Fig.7.
Inventor
W. G. Wilson,
By Marks & Clerk
Attys.

Patented July 1, 1924.

1,500,021

UNITED STATES PATENT OFFICE.

WALTER GORDON WILSON, OF FARNINGHAM, ENGLAND.

RIVET OR CLIP.

Application filed February 13, 1922. Serial No. 536,293.

*To all whom it may concern:*

Be it known that I, WALTER GORDON WILSON, a subject of the King of Great Britain and Ireland, and residing at Charton, Farningham, Kent, England, have invented a certain new and useful Improved Rivet or Clip, of which the following is a specification.

This invention relates to rivets especially suitable for securing a brake lining to its metal backing.

When it is necessary to secure a brake lining to its metal backing, while it is easy to bore and countersink the holes in the metal backing to receive the head and one end of the shank, it is necessary in the acting surface of the brake band to bore a hole to accommodate the other rivet head, and a smaller hole to fit the shank. Not only do these holes weaken the braking material but it lessens the area of the effective surface of the brake. In addition, when the band is formed of a material such as asbestos and finely divided brass the boring of holes therein is neither satisfactory nor easy.

The object of the present invention is to provide a means of attaching the braking material to the metal backing by which it is only necessary to bore a hole in the backing, the rivet being self-securable in the other layer or member, without there being any necessity to bore a hole therein.

The invention consists in a self securing rivet comprising a shank split from one end towards the other, a head at such other end forming a pair of tapered prongs, said prongs having both inside and outside faces curved outwardly at their free ends and the outside faces progressively reduced, whereby an initial directional set is given to the prongs which when driven into the material are embedded therein the prongs spreading apart laterally and upwardly into the material with relatively little downward penetration.

Other features of the invention are hereinafter fully set forth and claimed in the appended claim.

The invention will now be described with reference to the accompanying drawings which illustrate on an enlarged scale several forms of fastening devices which may be employed in carrying out the invention and in which:—

Figure 1 is a side elevation of one form of rivet ready for use.

Figure 2 is an end view looking from the prongs towards the head.

Figure 3 is an irregular transverse section taken on the line 3—3 Figure 1.

Figure 4 is a side elevation of a second form of rivet.

Figures 5 and 6 are transverse sections taken respectively on lines 5—5 and 6—6 of Figure 4.

Figure 7 shows a rivet in position and holding together two bodies, and

Figure 8 shows a punch to facilitate the use of a rivet.

In Figures 1, 2 and 3, the device comprises a rivet having a countersunk head $a$, and a shank $b$, which is longitudinally and centrally divided or split as at $c$ from a point immediately beneath the head. The split faces at $c$ extend parallel with each other for about two thirds of the length of the shank, and are then flared outwards from one another at $d$, these faces $d$ being left flat as shown in the section, Figure 3, and not rounded or curved.

The exterior of each half shank $b$ as far as the part $e$ is semi-circular, after which such exterior is cut or ground away in a curve $f$ which meets the flared face $d$ in a chisel edge $g$. The intervening distance between the edges $g$ is the same or slightly less than the complete diameter of the shank.

Each shank $b$ thus ends in a talon, the mean longitudinal centre line of which is a line curving outwards so that the talon is given direction or is initially set, in order that when it penetrates, it will do so along a predetermined curved line, the exterior surface of which is cut away at $f$ to form a weakened area which is considerably longer than the extent of the flared surface $d$.

The shank has a full section from the point $e$ inwards towards the head, and most of the bending strain occurs at and adjacent this point, and there will be no bending after the shank passes within the metal backing indicated by the dotted line $h$.

To secure the brake band or lining $k$ which is made of any suitable and usual material for instance, asbestos and finely divided brass, to its metal backing $h$, see Figure 7, the usual hole $l$ is bored in the backing and countersunk. With the lining in position under the backing, the claw-like points $g$ of the rivet are passed through the hole and pressed into the lining after which the whole rivet is hammered down till the head fits snugly on or into the metal backing, see Figure 7.

When the rivet is hammered down in this way, the flared surfaces $d$ are forced apart along a curved line by the material of the brake band wedged between the surfaces, this being assisted by the weakened parts $f$ of each claw. The spreading movement of the claws is also assisted by the cross section of each claw, the surfaces $d$ and $f$ being flat in cross section as shown. Such cross sectional shape may allow a certain amount of bending to occur progressively along each claw, but the greatest part of the bending takes place at or about the part $e$. When the rivet has assumed its final condition, it will be seen that the claws have passed through an angle of 90° and more and have turned upwards towards the metal backing.

Referring to Figures 4, 5 and 6, the exterior profile is imparted to the split shank by cutting away the metal on the inner side of each shank by a V-shaped cutter or otherwise as indicated by the dotted lines. The two shanks with their flat inner faces are then folded together, see Figure 6, and the free ends bent outwards to form the surfaces $d$.

To assist the fixing of any of these rivets, the punch $n$, Figure 8, may be employed to prepare a cavity in the friction member. The divergent surfaces $o$ at its end impart to the material a pair of converging shoulders which predispose the claws of the rivet to spread apart symmetrically so that the rivet will be driven in squarely.

By the above described forms of rivet, two bodies are secured together rigidly and permanently and merely by hammering them in. The depth of penetration is relatively slight which is of great advantage when applied to brake linings. Assuming for example the total thickness of the band to be one-half inch, the depth to which the claws penetrate would not exceed one eighth or tenth of an inch, thus leaving the band a thickness of three-eighths of an inch of untouched fabric before reaching the claws. The brake band is secured by the necessary number of rivets in this way, such rivets being preferably staggered. The life of the brake band is substantially prolonged, and its structure is not initially damaged in fixing. Moreover, the fixing operation is very simple and quick, and an absolutely rigid connection with the backing is assured. It is not absolutely necessary that the backing should be of metal.

It is to be noted that the claws are chisel-edged and therefore grip the fabric more tightly than would sharp points.

It will be evident that a bifurcated rivet, as above described, may be used in addition for a variety of other purposes, such as fixing together the ends of driving belts by means of a lap plate, brake blocks, clutch faces or linings.

If necessary, besides boring a hole in the backing, a bore hole may be formed in the layer underlying the backing, so that any depth of penetration before spreading occurs may be provided for.

To give the rivets further holding power each of the talons may be formed transversely into two prongs, and the surfaces of both shanks or talons may be roughened, knurled or the like to increase the contact surface.

Having now described my invention, what I claim as new and desire to secure by Letters Patent is:—

A self-securing bifurcated rivet comprising a shank split from one end towards the other, a head at such other end the split end forming a pair of tapered prongs, said prongs having both inside and outside faces curved outwardly at their free ends and the outside faces progressively reduced, whereby an initial directional set is given to the prongs which when driven into the material are embedded therein the prongs spreading apart laterally and upwardly into the material with relatively little downward penetration.

In testimony whereof I have signed my name to this specification.

WALTER GORDON WILSON.